United States Patent
Shimizu et al.

(10) Patent No.: US 11,702,033 B2
(45) Date of Patent: Jul. 18, 2023

(54) VEHICLE OPERATION DETECTION DEVICE

(71) Applicants: AISIN CORPORATION, Kariya (JP); HONDA MOTOR CO., LTD., Tokyo (JP)

(72) Inventors: Ayaka Shimizu, Kariya (JP); Takaya Aiyama, Kariya (JP); Koichi Hirota, Kariya (JP); Hiroshi Shingu, Wako (JP); Kenichiro Kagawa, Wako (JP); Toshihiro Kaneda, Wako (JP); Makoto Ono, Wako (JP); Satoshi Katayama, Wako (JP)

(73) Assignees: AISIN CORPORATION, Aichi (JP); HONDA MOTOR CO., LTD., Tokyo (JP)

( * ) Notice: Subject to any disclaimer, the term of this patent is extended or adjusted under 35 U.S.C. 154(b) by 589 days.

(21) Appl. No.: 16/807,762

(22) Filed: Mar. 3, 2020

(65) Prior Publication Data

US 2020/0282950 A1 Sep. 10, 2020

(30) Foreign Application Priority Data

Mar. 5, 2019 (JP) .................. 2019-039290

(51) Int. Cl.
*B60R 25/01* (2013.01)
*B60R 25/31* (2013.01)
(Continued)

(52) U.S. Cl.
CPC .............. *B60R 25/01* (2013.01); *B60Q 1/26* (2013.01); *B60Q 1/2619* (2013.01);
(Continued)

(58) Field of Classification Search
CPC . B60R 25/01; B60R 25/2027; B60R 25/2045; B60R 25/24; B60R 25/31;
(Continued)

(56) References Cited

U.S. PATENT DOCUMENTS 10,415,276 B2 * 9/2019 Bussis ..................... E05B 81/77
2008/0296926 A1 * 12/2008 Hanzel ................. H03K 17/941
704/251
(Continued)

FOREIGN PATENT DOCUMENTS

JP 2009-079353 * 4/2009 ............. E05F 15/14
JP 2010254262 A 11/2010
(Continued)

OTHER PUBLICATIONS

Office Action (Notice of Reasons for Refusal) dated Sep. 6, 2022, by the Japan Patent Office in corresponding Japanese Patent Application No. 2019-039290 and an English Translation of the Office Action. (6 pages).

*Primary Examiner* — Nay Tun
(74) *Attorney, Agent, or Firm* — Buchanan Ingersoll & Rooney PC

(57) ABSTRACT

A vehicle operation detection device includes sensors laid out in a vehicle along an axis in an opening-closing direction of a door of the vehicle. When the user moves a part of a body toward the sensors and a motion of moving the part of the body along the axis is detected, the sensors detect an opening-closing operation for the door. The vehicle operation detection device further includes light-emitting members laid out in the vehicle along the axis in the opening-closing direction and an operation direction indicator configured to drive the light-emitting members in sequence in a first direction in a fully-closed state of the door and drives the light-emitting members in sequence in a second direction in a fully-open state of the door.

8 Claims, 8 Drawing Sheets

(51) Int. Cl.
- *B60R 25/24* (2013.01)
- *B60Q 1/26* (2006.01)
- *B60R 25/20* (2013.01)

(52) U.S. Cl.
CPC ........ *B60Q 1/2669* (2013.01); *B60R 25/2027* (2013.01); *B60R 25/2045* (2013.01); *B60R 25/24* (2013.01); *B60R 25/31* (2013.01); *B60Q 2900/40* (2022.05); *B60R 2325/10* (2013.01)

(58) Field of Classification Search
CPC ... B60R 2325/10; B60R 25/2054; B60Q 1/26; B60Q 1/2619; B60Q 1/2669; B60Q 2900/40; B60Q 1/50; B60Q 1/323; G07C 2209/63; G07C 2209/64; G07C 2209/65
USPC ............................................ 701/49; 340/5.72
See application file for complete search history.

(56) References Cited

U.S. PATENT DOCUMENTS

| | | | | |
|---|---|---|---|---|
| 2009/0134661 A1* | 5/2009 | Sugiura | ................... | B60Q 3/54 362/501 |
| 2009/0160211 A1* | 6/2009 | Krishnan | ................... | B60J 5/04 292/216 |
| 2011/0043325 A1* | 2/2011 | Newman | ................. | E05F 15/46 340/5.2 |
| 2012/0249291 A1* | 10/2012 | Holcomb | .......... | G07C 9/00563 340/5.51 |
| 2014/0197730 A1* | 7/2014 | Spence | .................... | G07C 9/20 315/80 |
| 2014/0330486 A1* | 11/2014 | Gehin | ................ | G07C 9/00309 701/49 |
| 2015/0002288 A1* | 1/2015 | Lee | ........................ | B60Q 1/323 340/471 |
| 2015/0315839 A1* | 11/2015 | Shigemoto | ................. | B60J 5/06 345/173 |
| 2015/0368935 A1 | 12/2015 | Sugita et al. | | |
| 2016/0349908 A1* | 12/2016 | Sugiura | ................... | E05B 81/64 |
| 2017/0028966 A1* | 2/2017 | Elie | ....................... | B60R 25/045 |
| 2017/0166164 A1* | 6/2017 | Sticherling | ............. | B60R 25/24 |
| 2017/0241186 A1* | 8/2017 | Koda | ................... | H03K 17/955 |
| 2017/0241187 A1* | 8/2017 | Takayanagi | ............. | E05F 15/75 |
| 2018/0298670 A1* | 10/2018 | Shomsky | ................ | E05F 15/79 |

FOREIGN PATENT DOCUMENTS

| | | | |
|---|---|---|---|
| JP | 2017-172140 | A | 9/2017 |
| JP | 2017172140 | A * | 9/2017 |
| WO | 2014/125577 | A1 | 8/2014 |

* cited by examiner

VEHICLE OPERATION DETECTION DEVICE

1. FIELD

The following description relates to a vehicle operation detection device that detects an opening-closing operation for the door of a vehicle.

2. DESCRIPTION OF RELATED ART

Japanese Laid-Open Patent Publication No. 2010-254262 describes a typical example of a vehicle operation detection device. The vehicle operation detection device includes the electrode of a capacitance sensor arranged in the door of a vehicle. When the electrode detects the motion of the user placing a part of the body such as a hand over the door, the door is locked or unlocked. That is, the motion of the user moving a part of the body toward the electrode is a locking-unlocking operation of locking or unlocking the door.

In another typical vehicle operation detection device, the same motion is the opening-closing operation for the door.

A further typical vehicle operation detection device includes electrodes laid out in the door in an opening-closing direction of the door. In this case, when the user moves a part of the body toward the electrodes and the motion of moving the part of the body in the opening-closing direction is detected, the door opens and closes. That is, the motion of moving a part of the body toward the electrodes and moving the part of the body in the opening-closing direction is the opening-closing operation for the door.

In a case where the motion of the user moving a part of the body toward the electrodes and moving the part of the body in the opening-closing direction is the opening-closing operation for the door, for example, the user may be uncertain whether he or she is operating correctly. This will worsen the usability.

SUMMARY

It is an objective of the present disclosure to provide a vehicle operation detection device that simplifies how to perform an opening-closing operation for the door of a vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present disclosure, a vehicle operation detection device is provided. The vehicle operation detection device includes sensors laid out in a vehicle along an axis in an opening-closing direction of a door of the vehicle and configured to individually output a detection signal that changes when a part of a body of a user moves toward the sensors. When the user moves the part of the body toward the sensors and a motion of moving the part of the body along the axis is detected, the sensors detect an opening-closing operation for the door. The vehicle operation detection device further includes light-emitting members laid out in the vehicle along the axis in the opening-closing direction and an operation direction indicator configured to drive the light-emitting members in sequence in a first direction extending along the axis and corresponding to an opening direction in a fully-closed state of the door and configured to drive the light-emitting members in sequence in a second direction extending along the axis and corresponding to a closing direction in a fully-open state of the door.

According to an aspect of the present disclosure, a vehicle operation detection device includes a set of sensors laid out in a vehicle in a first direction corresponding to an opening direction of a door of the vehicle. Each of the sensors is configured to detect a part of a body of a user. The vehicle operation detection device is configured to detect an opening operation for the door when the user moves the part of the body toward one of the sensors and moves the part of the body in the first direction, and detect a closing operation for the door when the user moves the part of the body toward another one of the sensors and moves the part of the body in a second direction that is opposite to the first direction. The vehicle operation detection device also includes a set of light-emitting members laid out in the vehicle in the first direction and processing circuitry configured to drive the light-emitting members in sequence in the first direction when the door is in a fully-closed state and configured to drive the light-emitting members in sequence in the second direction when the door is in a fully-open state.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle operation detection device according to an embodiment will now be described.

Figure 1:
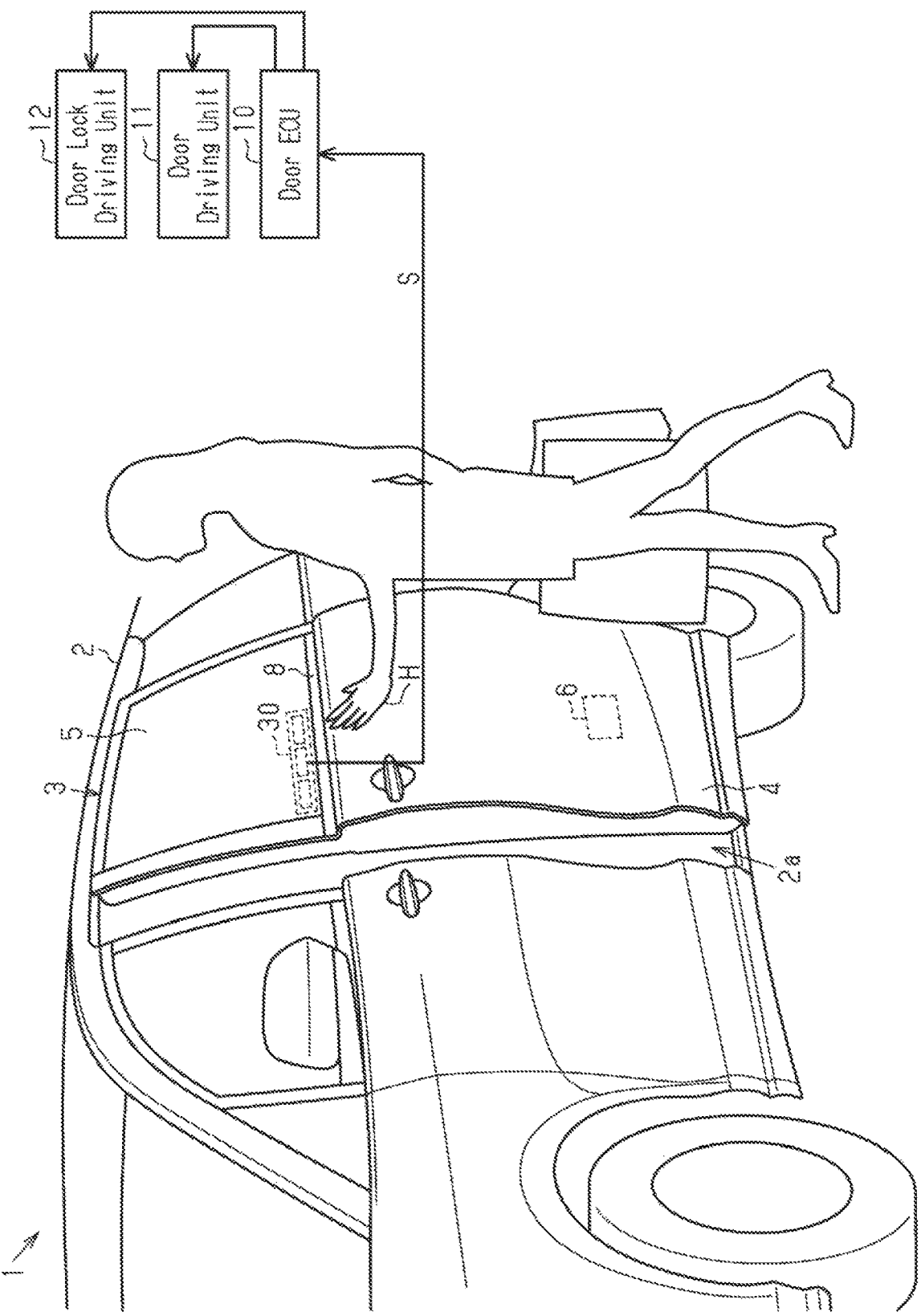
FIG. 1 is a perspective view showing the side structure of a vehicle to which a vehicle operation detection device according to an embodiment is applied.

FIG. 1 shows a vehicle 1, such as an automobile, including a body 2. The side part of the body 2 has an opening 2a. Further, the side part of the body 2 incorporates a sliding door 3. When moving in the front-rear direction, the sliding door 3 opens and closes the opening 2a. The sliding door 3 is arranged on the side part of the vehicle 1 and moves in the horizontal direction. The sliding door 3 includes a door body 4 and a window glass 5. The door body 4 is the lower portion of the sliding door 3 and has a substantially hollow structure. The window glass 5 moves in the up-down direction from the door body 4. The door body 4 includes a door lock 6 that locks and unlocks the sliding door 3 that is in a fully-closed state.

The sliding door 3 includes a door driving unit 11 located, for example, in the door body 4. The door driving unit 11 mainly includes an electric drive source such as an electric motor. The door driving unit 11 is mechanically cooperated with the body 2 by a door driving mechanism to open and close the sliding door 3. Further, the sliding door 3 includes a door lock driving unit 12 located, for example, adjacent to the door lock 6. The door lock driving unit 12 mainly includes an electric drive source such as an electric motor. The door lock driving unit 12 is mechanically cooperated with the door lock 6 by a door driving mechanism to lock and unlock the door lock 6.

The door driving unit 11 and the door lock driving unit 12 are both electrically connected to a door electronic control unit (ECU) 10 including, for example, a microcontroller unit (MCU). Further, door driving unit 11 and the door lock driving unit 12 are both individually driven by the door ECU 10.

The window glass 5 includes a substantially elongated sensor unit 30 located immediately above the door body 4 when the window glass 5 is closed. The sensor unit 30 adheres to the inner surface of the window glass 5 of the vehicle 1.

Figure 2A:
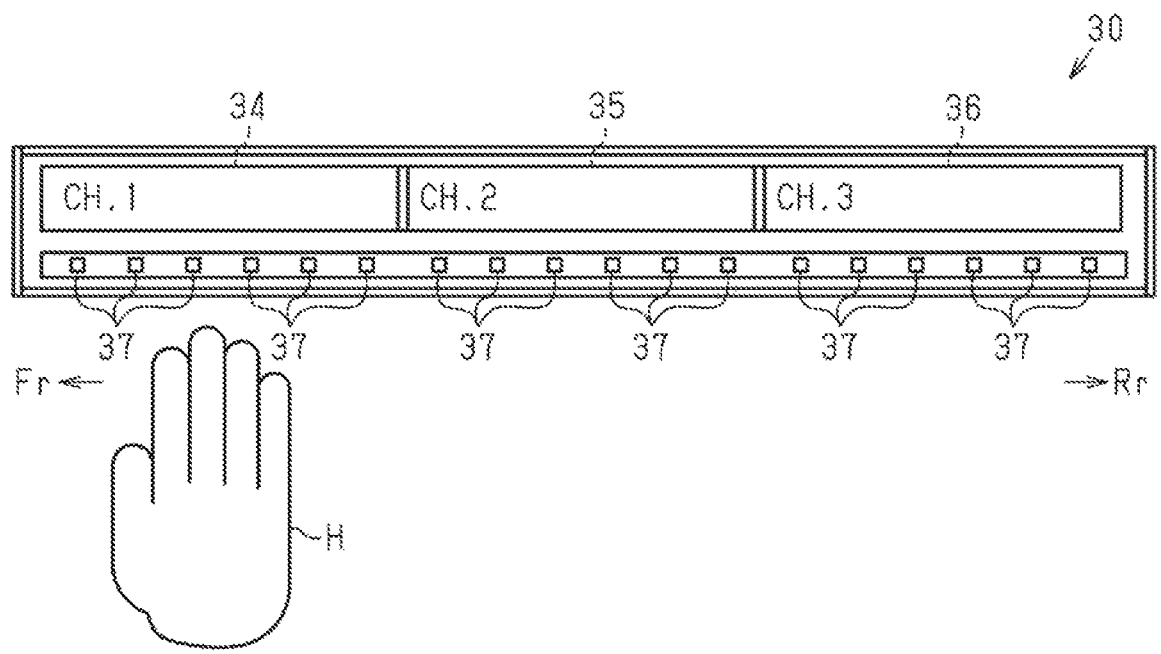
FIG. 2A is a front view showing the structure of the vehicle operation detection device of the embodiment in FIG. 1.
Figure 2B:
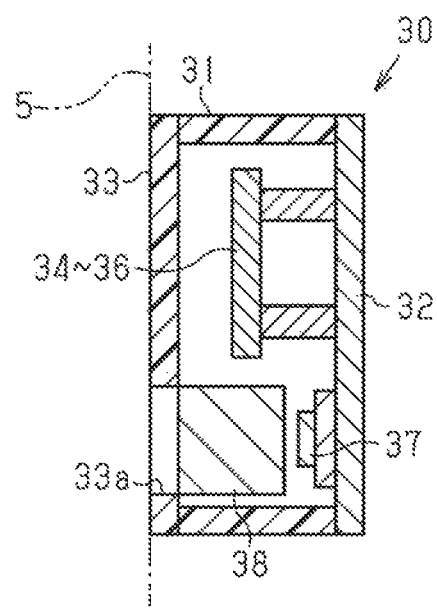
FIG. 2B is a cross-sectional view showing the structure of the vehicle operation detection device of the embodiment in FIG. 1.

Referring to FIGS. 2A and 2B, the sensor unit 30 includes a case 31 serving as a housing of the sensor unit 30. The case 31 includes a base 32 and a cover 33. The base 32 is formed by, for example, an iron plate and is substantially elongated. The cover 33 is made of, for example, a plastic material and has a lid and the form of a substantially rectangular tube. The cover 33 is coupled to the base 32 such that the cover 33 is closer to the window glass 5 than the base 32. This defines an accommodation space between the cover 33 and the base 32.

The case 31 accommodates a first electrode 34, a second electrode 35, and a third electrode 36. Each of the first electrode 34, the second electrode 35, and the third electrode 36 is the electrode of a capacitance sensor. The first electrode 34, the second electrode 35, and the third electrode 36 are laid out so as to be spaced apart from one another in the front-rear direction, which corresponds to an axis in the opening-closing direction of the door. That is, the first electrode 34, the second electrode 35, and the third electrode 36 correspond to sensors laid out in the vehicle along the axis in the opening-closing direction of the door of the vehicle 1. The shapes of the first to third electrodes 34 to 36 are substantially the same. Each of the first to third electrodes 34 to 36 changes in capacitance when a part of the body of the user such as a hand H moves toward the surface of the window glass 5 in the vicinity of the sensor unit 30. That is, the capacitance of each of the first to third electrodes 34 to 36 increases as a part of the body of the user becomes closer and decreases as the part of the body of the user becomes farther away.

Further, the case 31 includes light-emitting diodes (LEDs) 37 below the first electrode 34, the second electrode 35, and the third electrode 36. The LEDs 37 are laid out so as to be spaced apart from one another in the front-rear direction, which corresponds to the axis in the opening-closing direction of the door. That is, the LEDs 37 correspond to light-emitting members laid out in the vehicle 1 along the axis in the opening-closing direction. The number of the LEDs 37 is a multiple of the number of each of the first to third electrodes 34 to 36 such that the same number of the LEDs 37 are provided below each of the first to third electrodes 34 to 36. More specifically, one electrode includes six LEDs 37. In addition, the case 31 accommodates a light guide 38 such that the light guide 38 is closer to the window glass 5 than the LEDs 37. The light guide 38 guides the light of the LEDs 37 toward the window glass 5. The cover 33 includes a through-hole 33a opposed to the light guide 38.

The electrical configuration of the sensor unit 30 will now be described.

Figure 3:
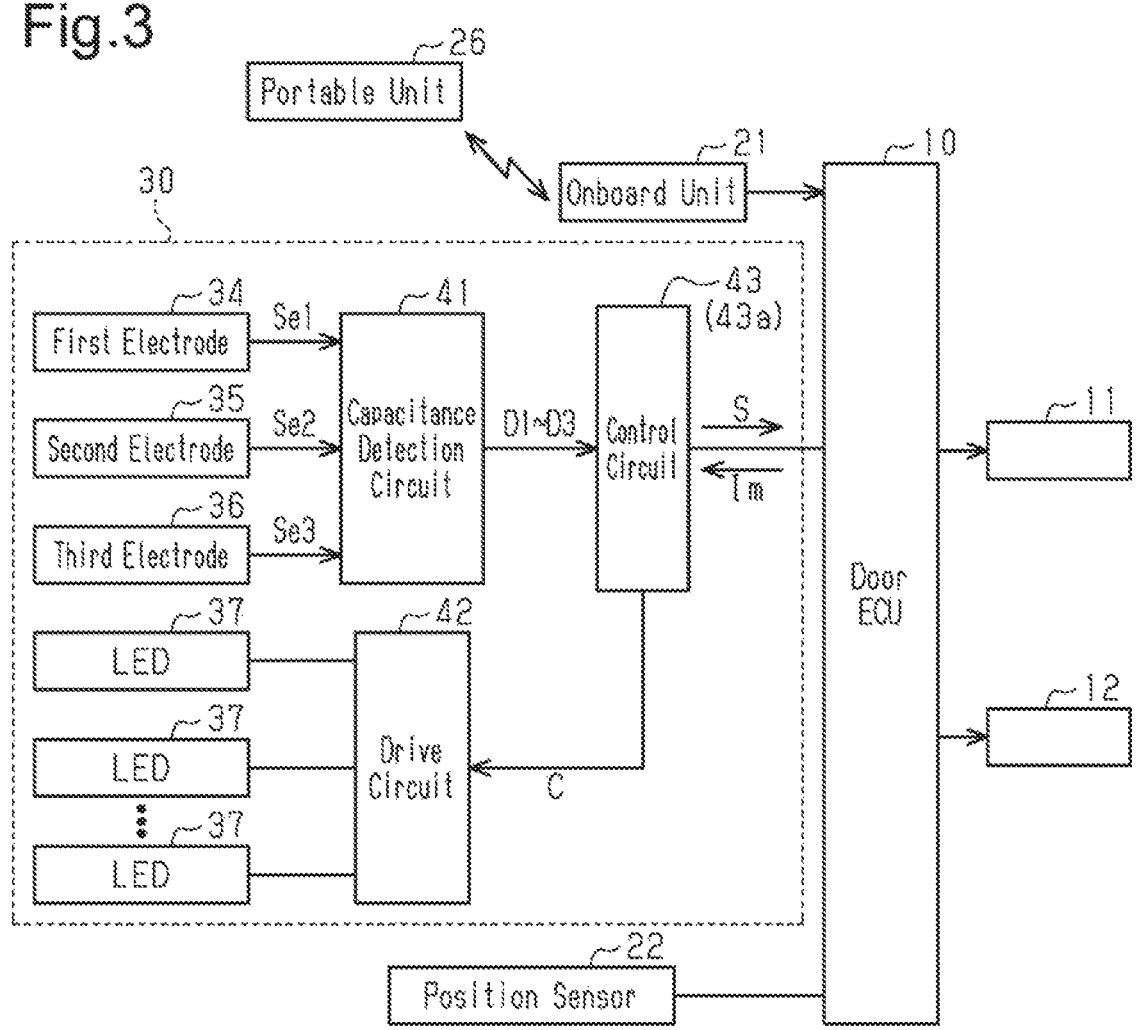
FIG. 3 is a block diagram showing the electric configuration of the vehicle operation detection device of the embodiment in FIG. 1.

As shown in FIG. 3, the sensor unit 30 includes a capacitance detection circuit 41, a drive circuit 42, and a control circuit 43. The capacitance detection circuit 41 is individually connected to the first to third electrodes 34 to 36. The drive circuit 42 is individually connected to the LEDs 37. The control circuit 43 serves as an operation direction indicator 43a connected to the capacitance detection circuit 41 and the drive circuit 42. Further, the sensor unit 30 is connected to the door ECU 10 in the control circuit 43.

Each of the first to third electrodes 34 to 36 outputs, to the capacitance detection circuit 41, detection signals Se1, Se2, and Se3 at the voltage levels corresponding to the capacitance of the electrodes. The capacitance detection circuit 41 generates detection data D1, D2, and D3, into which the detection signals Se1 to Se3 are respectively converted from analogue to digital, and outputs the detection data D1, D2, and D3 to the control circuit 43. Needless to say, the detection data D1 to D3 change when a part of the body of the user moves toward the surface of the window glass 5 in the vicinity of the sensor unit 30.

Figure 4A:
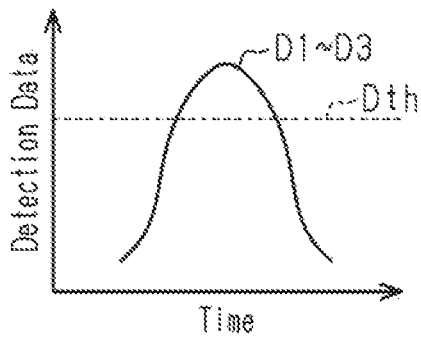
FIG. 4A is a timing diagram illustrating a mode of detecting the operation of the vehicle operation detection device of the embodiment in FIG. 1.

The control circuit 43 uses the detection data D1 to D3 to detect various types of operation of opening and closing the sliding door 3. In a normal operation of the present embodiment, the motion of the user moving a part of the body toward the surface of the window glass 5 in the vicinity of the sensor unit 30 indicates that the opening-closing operation of the sliding door 3 has been started. At this time, as shown in FIG. 4A, as the detection data D1 to D3 vary, the magnitude relationship with a predetermined threshold value Dth reverses. As the magnitude relationship between the detection data D1 to D3 and the threshold value Dth reverses, the control circuit 43 detects that the opening-closing operation of the sliding door 3 has been started.

Figure 4B:
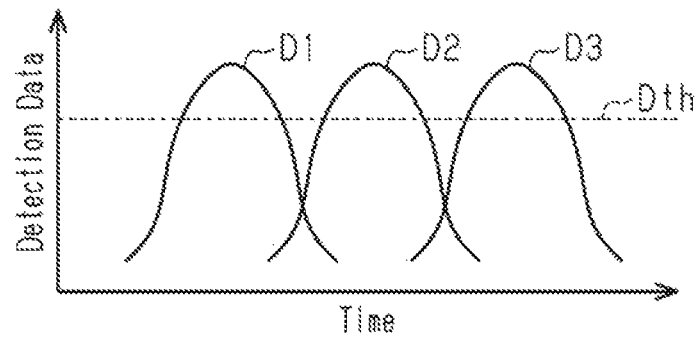
FIG. 4B is a timing diagram illustrating a mode of detecting the operation of the vehicle operation detection device of the embodiment in FIG. 1.

The motion of the user moving in the rearward direction by moving a part of the body toward the surface of the window glass 5 in the vicinity of the sensor unit 30 may be referred to as rear swiping. The rearward direction corresponds to a first direction, which is the axis corresponding to the opening direction of the door. In a normal operation of the present embodiment, rear swiping represents an opening operation for the sliding door 3 and an unlocking operation for the door lock 6 corresponding to the opening operation. At this time, as shown in FIG. 4B, as the detection data D1 to D3 vary in this sequence, the magnitude relationship with the threshold value Dth reverses. As the magnitude relationship of the detection data D1 to D3 with the threshold value Dth reverses in this sequence, the control circuit 43 detects, for example, the opening operation for the sliding door 3.

The motion of the user moving in the frontward direction by moving a part of the body toward the surface of the window glass 5 in the vicinity of the sensor unit 30 may be referred to as front swiping. The frontward direction corresponds to a second direction, which is the axis corresponding to the closing direction of the door. In a normal operation of the present embodiment, front swiping represents a closing operation for the sliding door 3 and a locking operation for the door lock 6 corresponding to the opening operation. At this time, as the detection data D1 to D3 vary in reverse sequence, the magnitude relationship with the threshold value Dth reverses. That is, as the detection data D3, the detection data D2, and the detection data D1 vary in sequence, the magnitude relationship with the threshold value Dth reverses. As the magnitude relationship of the detection data D1 to D3 with the threshold value Dth reverses in reverse sequence, the control circuit 43 detects, for example, the closing operation for the sliding door 3.

As shown in FIG. 3, the control circuit 43 outputs to the door ECU 10 an operation signal S indicating the detection result of the opening-closing operation for the sliding door 3.

Further, the control circuit 43 generates a control signal C corresponding to an information signal Im from the detection data D1 to D3 and the door ECU 10 and outputs the control signal C to the drive circuit 42. The drive circuit 42 drives the LEDs 37 in response to the control signal C.

The door ECU 10 is connected to an onboard unit 21 mounted in the body 2. The onboard unit 21 corresponds to a communication member. The onboard unit 21 functions as a wireless communication system with a portable unit 26, which serves as an electronic key carried by the user. The onboard unit 21 executes ID authentication by verifying an ID code through bilateral communication with the portable unit 26. The onboard unit 21 transmits to the door ECU 10 a signal indicating the result of the ID authentication.

When the signal from the onboard unit 21 indicates that ID authentication is established, upon receipt of the operation signal S indicating the opening operation or the like for the sliding door 3 from the control circuit 43, the door ECU 10 drives the door lock driving unit 12 to unlock the door lock 6 and drives the door driving unit 11 to open the sliding door 3. When the signal from the onboard unit 21 indicates that ID authentication is established, upon receipt of the operation signal S indicating the closing operation or the like for the sliding door 3 from the control circuit 43, the door ECU 10 drives the door lock driving unit 12 to lock the door lock 6 and drives the door driving unit 11 to close the sliding door 3.

The door ECU 10 is connected to a position sensor 22 that detects an opening-closing position of the sliding door 3. The door ECU 10 uses the detection result of the position sensor 22 to detect the opening-closing position of the sliding door 3.

The door ECU 10 generates the information signal Im, which indicates the establishment result of ID authentication or the opening-closing position of the sliding door 3, and outputs the information signal Im to the control circuit 43.

The modes of driving the LEDs 37 in the present embodiment will now be described. In FIGS. 5 to 10, the LEDs 37 with radial lines indicate that the LEDs 37 are on or blinking.

Figure 5:
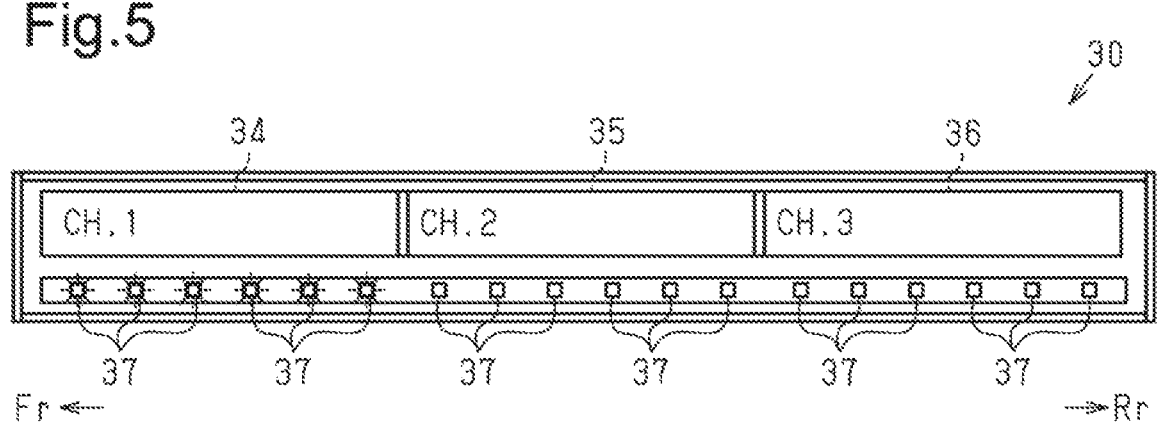
FIG. 5 is a front view illustrating a mode of driving the LEDs when ID authentication is established in a fully-closed state of the door in the vehicle operation detection device of the embodiment in FIG. 1.

First, when ID authentication is established in the fully-closed state of the sliding door 3, as shown in FIG. 5, the control circuit 43 drives the six LEDs 37 located immediately below the first electrode 34 in correspondence with the position of the first electrode 34, toward which the user should initially move a part of the body, such that the LEDs 37 turn on or blink (the first electrode 34 corresponds to a sensor toward which the user should initially move a part of the body). In other words, the control circuit 43 drives the six LEDs 37 located immediately below the control circuit 43 in correspondence with the detection range of the first electrode 34 that is currently detecting capacitance such that the six LEDs 37 turn on or blink. This is for the user to understand the position of the first electrode 34, toward which the user should initially move a part of the body, when the opening operation for the sliding door 3 is performed. Also, this is for the user to understand that the motion of the opening operation for the sliding door 3 is under reception.

Figure 6:
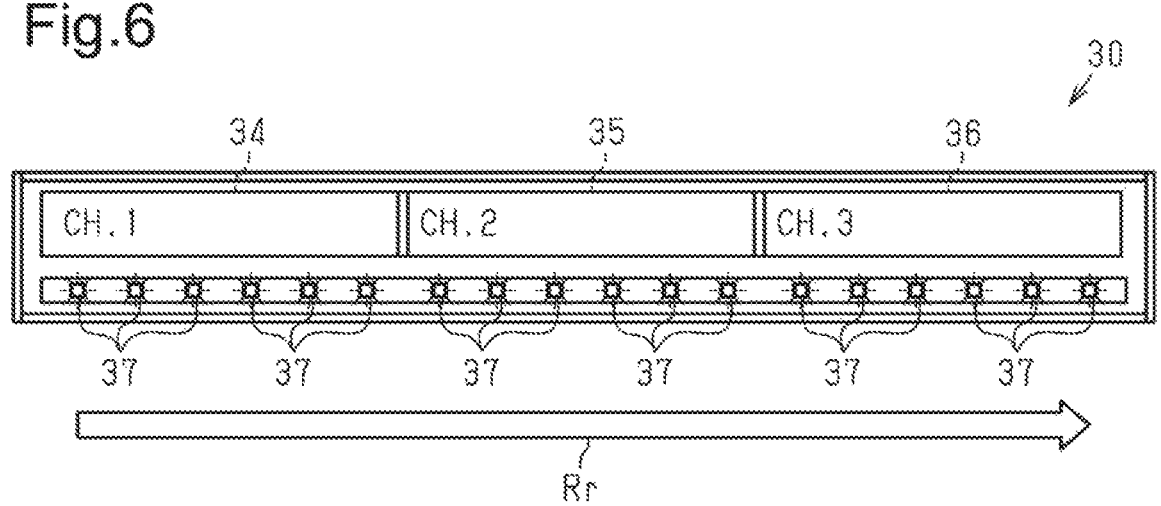
FIG. 6 is a front view illustrating a mode of driving the LEDs when the reception of the motion of the opening operation for the door is completed in the vehicle operation detection device of the embodiment in FIG. 1.

Next, when the reception of the above-described motion of the opening operation for the sliding door 3 is completed, as shown in FIG. 6, the control circuit 43 drives the LEDs 37 to turn on or blink in sequence in a rearward direction Rr.

The rearward direction Rr corresponds to the first direction, which is the axis corresponding to the opening direction of the door. That is, the control circuit 43 drives the LEDs 37 in sequence in the rearward direction Rr from the frontmost one of the six LEDs 37 located immediately below the first electrode 34 to the rearmost one of the six LEDs 37 located immediately below the third electrode 36. This causes the LEDs 37 to turn on or blink in sequence in the rearward direction Rr in a flowing manner. In such a manner, in the fully-closed state of the sliding door 3, after the control circuit 43 drives the LEDs 37 located immediately below the first electrode 34 and the first electrode 34 detects a part of the body, the control circuit 43 drives the LEDs 37 located immediately below the second electrode 35. In FIG. 6, the blank arrow indicates a mode in which the LEDs 37 turn on or blink in sequence in the rearward direction Rr. This is for the user to easily remember that the opening operation for the sliding door 3 is the motion of moving a part of the body toward the first to third electrodes 34 to 36 and moving the part of the body in the rearward direction Rr, that is, rear swiping. Also, this is for the user to understand where rear swiping starts and ends. Further, this is for the user to understand that rear swiping is under reception.

If there is a limit to the speed of rear swiping, the speed of switching the LEDs 37 may be set in correspondence with the rear swiping speed. This allows the user to understand a limit to rear swiping by visually recognizing the LEDs 37.

Figure 7:
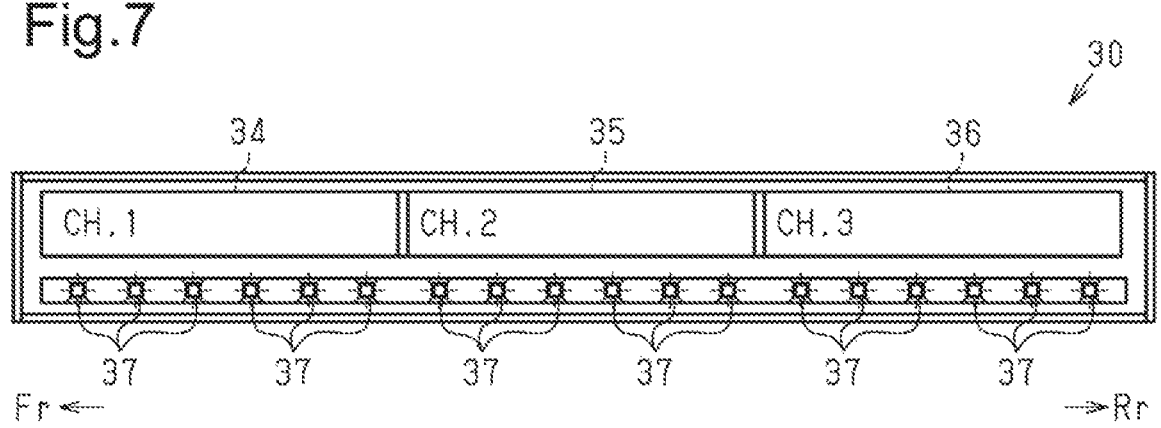
FIG. 7 is a front view illustrating a mode of driving the LEDs when the reception of rear swiping is completed in the vehicle operation detection device of the embodiment in FIG. 1.

Subsequently, it is assumed that the reception of rear swiping is completed. At this time, as shown in FIG. 7, the control circuit 43 drives the LEDs 37 located immediately below the first to third electrodes 34 to 36 such that all the LEDs 37 turn on or blink. This is for the user to understand that the reception of rear swiping is completed.

Figure 8:
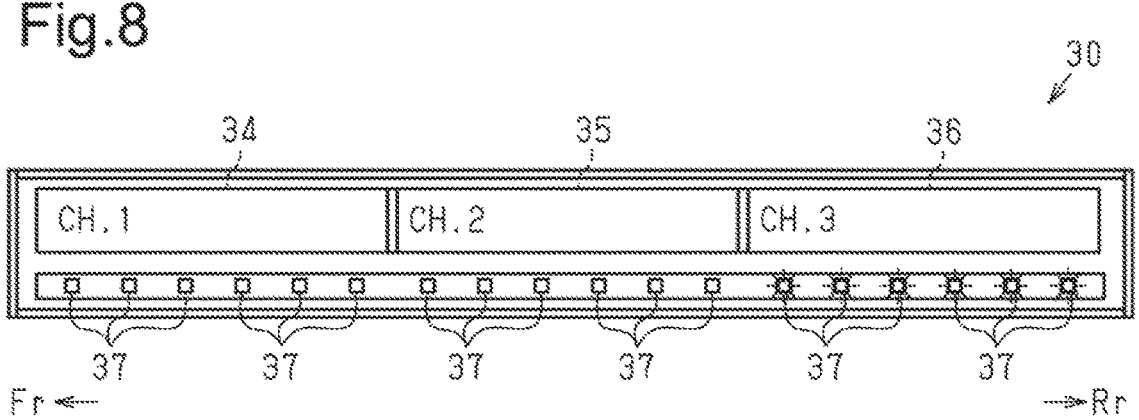
FIG. 8 is a front view illustrating a mode of driving the LEDs when ID authentication is established in a fully-open state of the door in the vehicle operation detection device of the embodiment in FIG. 1.

When ID authentication is established in the fully-closed state of the sliding door 3, as shown in FIG. 8, the control circuit 43 drives the six LEDs 37 located immediately below the third electrode 36 in correspondence with the position of the third electrode 36, toward which the user should initially move a part of the body, such that the LEDs 37 turn on or blink (the third electrode 36 corresponds to the sensor toward which the user should initially move a part of the body). In other words, the control circuit 43 drives the six LEDs 37 located immediately below the control circuit 43 in correspondence with the detection range of the third electrode 36 that is currently detecting capacitance such that the six LEDs 37 turn on or blink. This is for the user to understand the position of the third electrode 36, toward which the user should initially move a part of the body, when the closing operation for the sliding door 3 is performed. Also, this is for the user to understand that the motion of the closing operation for the sliding door 3 is under reception.

Figure 9:
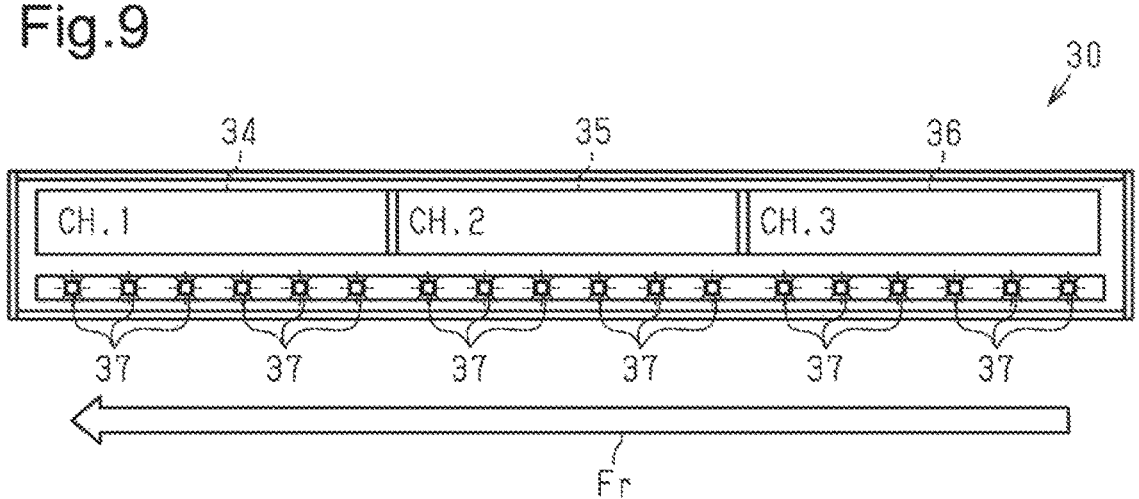
FIG. 9 is a front view illustrating a mode of driving the LEDs when the reception of the motion of the closing operation for the door is completed in the vehicle operation detection device of the embodiment in FIG. 1.

Next, when the reception of the above-described motion of the closing operation for the sliding door 3 is completed, as shown in FIG. 9, the control circuit 43 drives the LEDs 37 to turn on or blink in sequence in a frontward direction Fr. The frontward direction Fr corresponds to a second direction, which is the axis corresponding to the closing direction of the door. That is, the control circuit 43 drives the LEDs 37 in sequence in the frontward direction Fr from the rearmost one of the six LEDs 37 located immediately below the third electrode 36 to the frontmost one of the six LEDs 37 located immediately below the first electrode 34. This causes the LEDs 37 to turn on or blink in sequence in the frontward direction Fr in a flowing manner. In such a manner, in the fully-open state of the sliding door 3, after the control circuit 43 drives the LEDs 37 located immediately below the third electrode 36 and the third electrode 36 detects a part of the body, the control circuit 43 drives the LEDs 37 located immediately below the second electrode 35. In FIG. 9, the blank arrow indicates a mode in which the LEDs 37 turn on or blink in sequence in the frontward direction Fr. This is for the user to easily remember that the closing operation for the sliding door 3 is the motion of moving a part of the body toward the first to third electrodes 34 to 36 and moving the part of the body in the frontward direction Fr, that is, front swiping. Also, this is for the user to understand where front swiping starts and ends. Further, this is for the user to understand that front swiping is under reception.

If there is a limit to the speed of front swiping, the speed of switching the LEDs 37 may be set in correspondence with the front swiping speed. This allows the user to understand a limit to front swiping by visually recognizing the LEDs 37.

Then, when the reception of front swiping is completed, in the same manner as rear swiping, the control circuit 43 drives the LEDs 37 located immediately below the first to third electrodes 34 to 36 such that all the LEDs 37 turn on or blink. This is for the user to understand that the reception of front swiping is completed.

Figure 10:
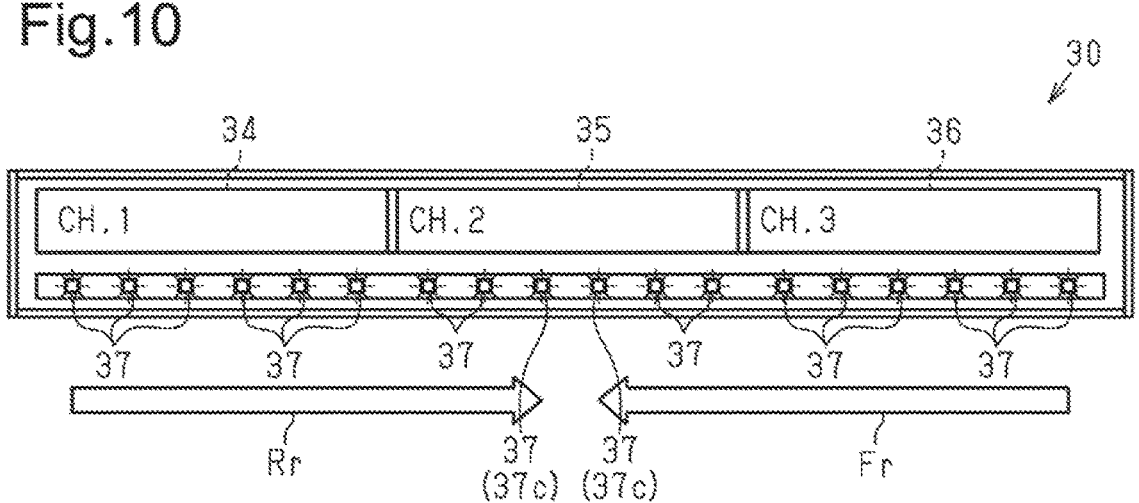
FIG. 10 is a front view illustrating a mode of driving the LEDs when the reception of front swiping is completed in the vehicle operation detection device of the embodiment in FIG. 1.

Each of the two LEDs 37 on the middle of the six LEDs 37 located immediately below the second electrode 35 corresponds to a middle light-emitting member located on the middle along the axis and may be referred to as middle LEDs 37c. When the sliding door 3 is in a semi-open state and ID authentication is established, as shown in FIG. 10, the control circuit 43 drives the LEDs 37 to turn on or blink in sequence in the rearward direction Rr toward the two middle LEDs 37c and drives the LEDs 37 to turn on or blink in sequence in the frontward direction Fr toward the two middle LEDs 37c. This causes the LEDs 37 to turn on or blink in sequence in the rearward direction Rr toward the two middle LEDs 37c in a flowing manner and causes the LEDs 37 to turn on or blink in sequence in the frontward direction Fr toward the two middle LEDs 37c in a flowing manner. That is, the control circuit 43 sequentially drives the LEDs 37 located immediately below the first electrode 34 and the LEDs 37 located immediately below the second electrode 35 and sequentially drives the LEDs 37 located immediately below the third electrode 36 and the LEDs 37 located immediately below the second electrode 35. In FIG. 10, the blank arrows indicate a mode of the LEDs 37 that turn on or blink in sequence in the rearward direction Rr toward the two middle LEDs 37c on the middle in the front-rear direction and turn on or blink in sequence in the frontward direction Fr toward the two middle LEDs 37c. This is for the user to simultaneously remember that the opening operation for the sliding door 3 is rear swiping and the closing operation for the sliding door 3 is front swiping in the semi-open state of the sliding door 3. Also, this is for the user to understand the position of the first electrode 34 or the third electrode 36, toward which the user should initially move a part of the body. Further, this is for the user to understand that the motion of the opening-closing operation for the sliding door 3 is under reception.

The control circuit 43 stops detecting all the capacitance of the first to third electrodes 34 to 36 in a detection prohibiting mode. The detection prohibiting mode is employed in, for example, a situation where the reduction of the power consumption is prioritized over the detection of the opening-closing operation of the sliding door 3 by the user when ID authentication has not been established for a predetermined time. The detection prohibiting mode is also employed in a situation where an erroneous detection scene in which a person never gets on or off such as window wiping or leaning is detected. When stopping detecting all the capacitance of the first to third electrodes 34 to 36, the control circuit 43 drives the LEDs 37 located immediately below the first to third electrodes 34 to 36 such that all the LEDs 37 turn off. This is for the user who has moved a part of the body to the first to third electrodes 34 to 36 for performing the opening-closing operation the sliding door 3 to understand that the reception of the operation is under prohibition.

The mode of driving the LEDs 37 in the present embodiment will now be summarized. This process is activated when, for example, the above-described detection prohibiting mode ends.

Figure 11:
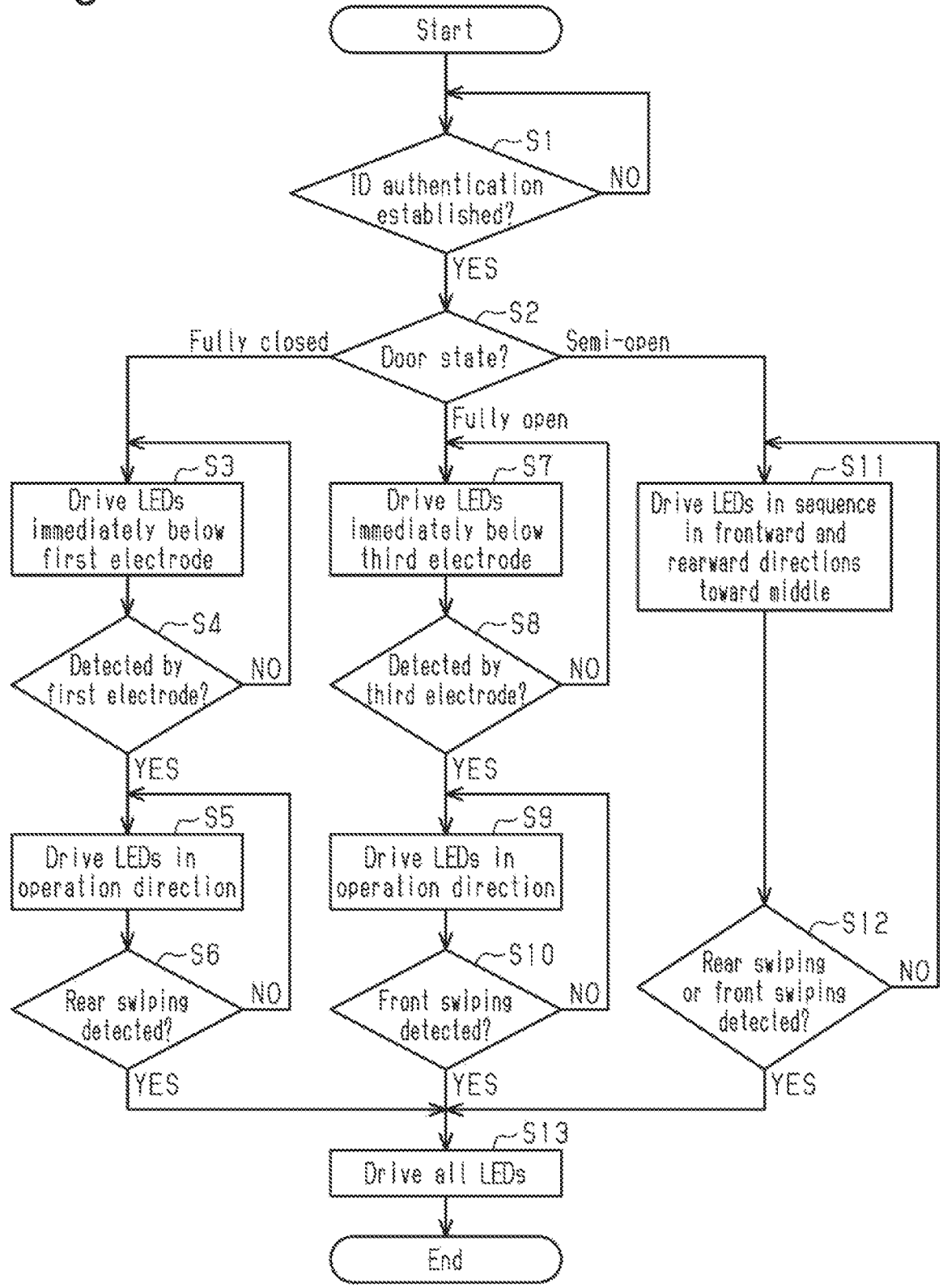
FIG. 11 is a flowchart illustrating a mode of driving the LEDs in the vehicle operation detection device of the embodiment in FIG. 1.

As shown in FIG. 11, when the process proceeds to this routine, the control circuit 43 determines whether ID authentication is established in step S1. The control circuit 43 waits for the ID authentication to be established. When the ID authentication is established, the control circuit 43 determines the state of the sliding door 3 in step S2. When determining that the sliding door 3 is in the fully-closed state in step S2, the control circuit 43 drives the LEDs 37 located immediately below the first electrode 34 such that the LEDs 37 turn on or blink in step S3 and determines whether a part of the body has been detected by the first electrode 34 in step S4. When determining that a part of the body has not been detected by the first electrode 34 in step S4, the control circuit 43 returns to step S3 to repeat the same process. When determining that a part of the body has been detected by the first electrode 34 in step S4, the control circuit 43 drives the LEDs 37 to turn on or blink in sequence in correspondence with the operation direction of rear swiping in step S5. Then, the control circuit 43 determines whether rear swiping has been detected in step S6. When determining that rear swiping has not been detected in step S6, the control circuit 43 returns to step S5 to repeat the same process. When determining that rear swiping has been detected in step S6, the control circuit 43 drives all the LEDs 37 to turn on or blink in step S13 and ends the process.

When determining that the sliding door 3 is in the fully-open state in step S2, the control circuit 43 drives the LEDs 37 located immediately below the third electrode 36 such that the LEDs 37 turn on or blink in step S7 and determines whether a part of the body has been detected by the third electrode 36 in step S8. When determining that a part of the body has not been detected by the third electrode 36 in step S8, the control circuit 43 returns to step S7 to repeat the same process. When determining that a part of the body has been detected by the third electrode 36 in step S8, the control circuit 43 drives the LEDs 37 to turn on or blink in sequence in correspondence with the operation direction of front swiping in step S9. Then, the control circuit 43 determines whether front swiping has been detected in step S10. When determining that front swiping has not been detected in step S10, the control circuit 43 returns to step S9 to repeat the same process. When determining that front swiping has been detected in step S10, the control circuit 43 drives all the LEDs 37 to turn on or blink in step S13 and ends the process.

When determining that the sliding door 3 is in the semi-open state in step S2, the control circuit 43 drives the LEDs 37 to turn on or blink in sequence in the rearward direction Rr toward the two middle LEDs 37*c* and drives the LEDs 37 to turn on or blink in sequence in the frontward direction Fr toward the two middle LEDs 37*c* in step S11. Then, the control circuit 43 determines whether rear swiping or front swiping has been detected in step S12. When determining that neither rear swiping nor front swiping has been detected in step S12, the control circuit 43 returns to step S11 to repeat the same process. When determining that either rear swiping or front swiping has been detected in step S12, the control circuit 43 drives all the LEDs 37 to turn on or blink in step S13 and ends the process.

When detecting rear swiping or front swiping, the control circuit 43 outputs to the door ECU 10 the operation signal S indicating the detection. As described above, the door ECU 10 uses the operation signal S to drive, for example, the door driving unit 11.

The operation and advantages of the present embodiment will now be described.

(1) In the present embodiment, the operation direction indicator 43*a* drives the LEDs 37 to turn on or blink in sequence in the rearward direction Rr. Thus, when visually recognizing that the LEDs 37 are on or blinking in this manner, the user can easily remember that the opening operation for the sliding door 3 is the motion of moving a part of the body toward the first to third electrodes 34 to 36 and moving the part of the body in the rearward direction Rr. Further, the operation direction indicator 43*a* drives the LEDs 37 to turn on or blink in sequence in the frontward direction Fr. Thus, when visually recognizing that the LEDs 37 are on or blinking in this manner, the user can easily remember that the closing operation for the sliding door 3 is the motion of moving a part of the body toward the first to third electrodes 34 to 36 and moving the part of the body in the frontward direction Fr. Accordingly, how to perform the opening-closing operation for the sliding door 3 is simplified.

Consequently, the user is less likely to incorrectly perform the opening-closing operation for the sliding door 3.

(2) In the present embodiment, when the sliding door 3 is in the semi-open state, the operation direction indicator 43*a* drives the LEDs 37 on the middle in the front-rear direction such that the LEDs 37 turn on or blink in sequence in the rearward direction Rr toward the middle LEDs 37*c* and drives the LEDs 37 on the middle in the front-rear direction such that the LEDs 37 turn on or blink in sequence in the frontward direction Fr toward the middle LEDs 37*c*. By visually recognizing that the LEDs 37 are on or blinking in this manner, the user can easily remember that the opening operation and closing operation for the sliding door 3 are the motions of moving a part of the body toward the first to third electrodes 34 to 36 and moving the part of the body in the rearward direction Rr and in the frontward direction Fr, respectively. Thus, when the sliding door 3 is in the semi-open state, how to perform the opening-closing operation for the sliding door 3 is simplified.

(3) In the present embodiment, when ID authentication is established, the operation direction indicator 43*a* drives the LEDs 37 to turn on or blink in correspondence with the position of one of the first to third electrodes 34 to 36, toward which the user should initially move a part of the body. By visually recognizing this, the user easily recognizes the positions of one of the first to third electrodes 34 to 36. Thus, by quickly moving a part of the body toward the position of one of the first to third electrodes 34 to 36, the user can smoothly advance to the opening-closing operation for the sliding door 3 that is performed subsequently.

(4) In the present embodiment, when the opening-closing operation for the sliding door 3 (i.e., rear swiping or front swiping) is detected, the operation direction indicator 43*a* drives all the LEDs 37 to turn on or blink. This allows the user to understand that the opening-closing operation for the sliding door 3 has been detected. Thus, there is no need for the user to pointlessly repeat the opening-closing operation while uncertain about whether the opening-closing operation for the sliding door 3 has been detected.

(5) In the present embodiment, in the detection prohibiting mode, the control circuit 43 drives the LEDs 37 located immediately below the first to third electrodes 34 to 36 such that all the LEDs 37 turn off. This allows the user to easily understand the reception of the opening-closing operation for the sliding door 3 is under prohibition.

The present embodiment may be modified as follows. The present embodiment and the following modifications can be combined as long as the combined modifications remain technically consistent with each other.

Figure 12:
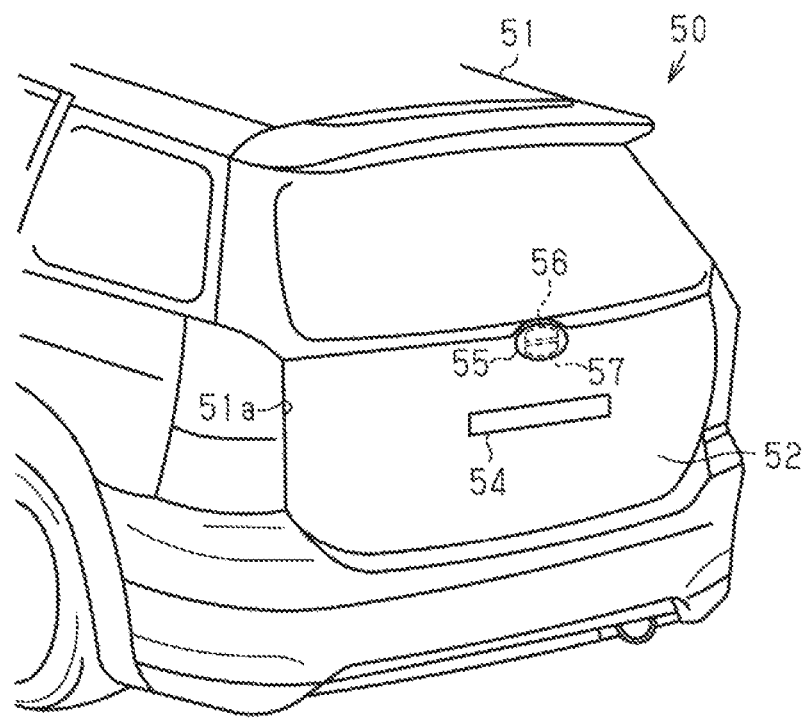
FIG. 12 is a perspective view showing the rear structure of a vehicle to which a vehicle operation detection device according to a modification is applied.

As shown in FIG. 12, the present disclosure may be applied to a vehicle 50 incorporating a back door 52. The back door 52 opens and closes an opening 51*a* at the rear part of a body 51. The back door 52 is coupled to the rear part of the vehicle 50 by a door hinge (not shown). The back door 52 moves in the vertical direction while pivoting around the door hinge. The back door 52 is coupled to the rear part of the body 51 by the door hinge, which is arranged on the upper part of the opening 51*a*, such that the back door 52 can be opened and closed. The back door 52 opens when pushed upward with respect to the door hinge. The back door 52 moves in the upward direction to change from the fully-closed state to the fully-open state and moves in the downward direction to change from the fully-open state to the fully-closed state.

Figure 13:
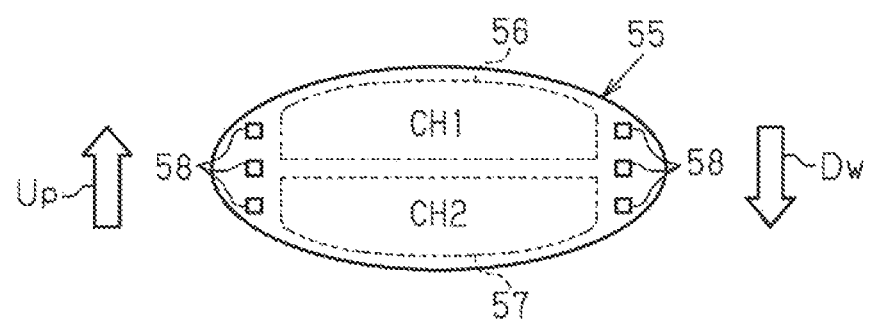
FIG. 13 is a front view showing the structure of the vehicle operation detection device of the modification in FIG. 12.

The middle portion of the outer surface of the back door 52, that is, the middle portion located above a garnish 54, is provided with an emblem 55 of, for example, a company name. As also shown in FIG. 13, the back part of the emblem 55 is provided with an upper electrode 56 and a lower electrode 57. Each of the upper electrode 56 and the lower electrode 57 is the electrode of a capacitance sensor. The upper electrode 56 and the lower electrode 57 are laid out so as to be spaced apart from each other in the up-down direction, which corresponds to the axis in the opening-closing direction of the door. That is, the upper electrode 56 and the lower electrode 57 correspond to sensors laid out in the vehicle 50 along the axis in the opening-closing direction of the door of the vehicle 50. The upper electrode 56 is located in the upper part of the emblem 55 and has a substantially crescent shape corresponding to the upper edge of the emblem 55. The lower electrode 57 is located in the lower part of the emblem 55 and has a substantially crescent shape corresponding to the lower edge of the emblem 55. Needless to say, the upper electrode 56 and the lower electrode 57 are spaced apart from each other in the up-down direction. The upper electrode 56 and the lower electrode 57 change in capacitance when a part of the body of the user moves toward the emblem 55.

In a normal operation of this modification, the motion of the user moving a part of the body toward the emblem 55 represents the operation of opening and closing the back door 52. That is, for example, the motion of the user moving a part of the body from the lower electrode 57 toward the upper electrode 56 in the vertical direction (hereinafter referred to as upper swiping) represents the operation of opening the back door 52, and the motion of the user moving a part of the body from the upper electrode 56 toward the lower electrode 57 in the vertical direction (hereinafter referred to as lower swiping) represents the operation of closing the back door 52. Upper swiping may represent the operation of opening the sliding door 3 and unlocking the door lock 6 corresponding to the opening operation. Lower swiping may represent the operation of opening the back door 52 and locking the door lock 6 corresponding to the closing operation.

Further, the back part of the emblem 55 is provided with LEDs 58 on the opposite sides of the upper electrode 56 and the lower electrode 57 in the width direction. The LEDs 58 are laid out so as to be spaced apart from one another in the up-down direction, which corresponds to the axis in the opening-closing direction of the door. The LEDs 58 correspond to light-emitting members laid out in the vehicle 50 along the axis in the opening-closing direction. The LEDs 58 are driven to turn on or blink in sequence in an upward direction Up when, for example, the reception of the opening operation for the back door 52 is completed. The upward direction Up corresponds to the first direction, which is the axis corresponding to the opening direction of the door. This causes the LEDs 58 to turn on or blink in sequence in the upward direction Up in a flowing manner. In FIG. 13, a mode in which the LEDs 58 turn on or blink in sequence in the upward direction Up is indicated by a blank arrow. The LEDs 58 are driven to turn on or blink in sequence in a downward direction Dw when, for example, the reception of the closing operation for the back door 52 is completed. The downward direction Dw corresponds to the second direction, which is the axis corresponding to the closing direction of the door. This causes the LEDs 58 to turn on or blink in sequence in the downward direction Dw in a flowing manner. In FIG. 13, a mode in which the LEDs 58 turn on or blink in sequence in the downward direction Dw is indicated by a blank arrow. When the LEDs 58 are driven to indicate upper swiping or lower swiping, the brightness of the LEDs 58 may be varied.

Even if such a change is made, the same advantages as those of the above-described embodiment can be gained.

The back door 52, for example, opens and closes when the door driving unit 11 and the door lock driving unit 12 are driven by the door ECU 10 in correspondence with the sliding door 3.

Figure 14:
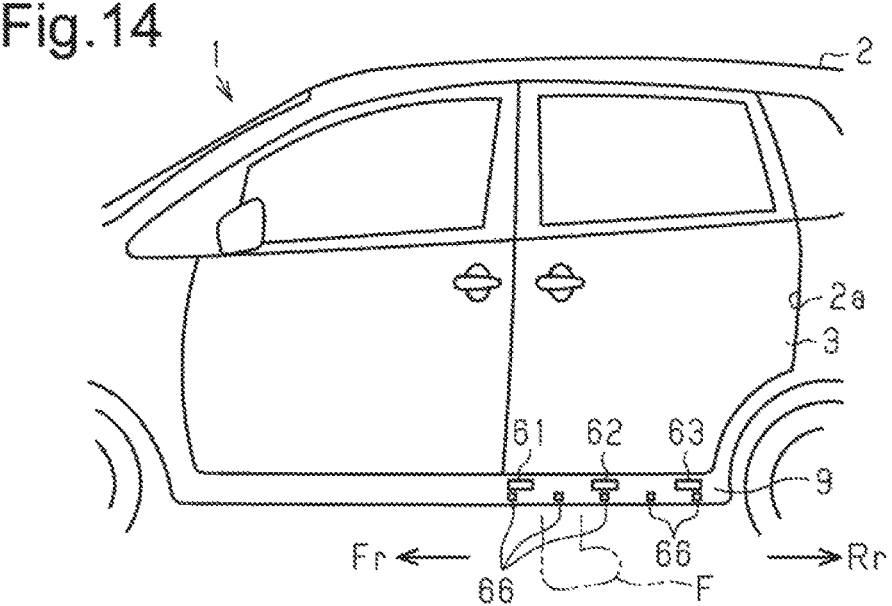
FIG. 14 is a side view showing the structure of the vehicle to which a vehicle operation detection device according to a modification is applied.

As shown in FIG. 14, the side part of the body 2 may be provided with a side skirt (rocker cover) 9 extending in the front-rear direction along the lower edge of the opening 2*a*. In this case, the side skirt 9 may include infrared sensors 61, 62, and 63, which correspond to the sensors, such that they are laid out so as to be spaced apart from one another in the front-rear direction. The front-rear direction corresponds to the axis in the opening-closing direction of the door. The infrared sensors 61 to 63, which correspond to the sensors, may be laid out so as to be spaced apart from one another in the front-rear direction in a side mudguard (not shown) extending in the front-rear direction along the lower edge of the sliding door 3. The front-rear direction corresponds to the axis in the opening-closing direction of the door. The infrared sensors 61 to 63 are laid out in sequence in the front-rear direction from the front toward the rear. Each of the infrared sensors 61 to 63 outputs a detection signal that changes when a part of the body of the user such as a foot F moves toward the surface of the side skirt 9.

In a normal operation of this modification, the motion of the user moving a part of the body of the user toward the side skirt 9 represents the operation for opening and closing the sliding door 3. That is, for example, the motion of the user moving a part of the body in the rearward direction (i.e., rear swiping) represents the operation for opening the sliding door 3 and unlocking the door lock 6 corresponding to the opening operation. The motion of the user moving a part of the body in the frontward direction (i.e., front swiping) represents the operation for closing the sliding door 3 and locking the door lock 6 corresponding to the closing operation. Rear swiping may represent only the operation for opening the sliding door 3. Likewise, front swiping may represent only the operation for closing the sliding door 3.

There may be any number of infrared sensors arranged in the side skirt 9 as long as the number of the infrared sensors is multiple. Further, the infrared sensors may be replaced with, for example, the electrodes of capacitance sensors, optical sensors (such as pyroelectric sensors), ultrasonic sensors, or heat sensors.

The side skirt 9 includes LEDs 66 on the lower side of the infrared sensors 61 to 63. The LEDs 66 are laid out so as to be spaced apart from one another in the front-rear direction, which corresponds to the axis in the opening-closing direction of the door. The LEDs 66 correspond to the light-emitting members laid out in the vehicle 1 along the axis in the opening-closing direction. The LEDs 66 are driven to turn on or blink in sequence in the rearward direction Rr when, for example, the reception of the opening operation for the sliding door 3 is completed. The rearward direction Rr corresponds to the first direction, which is the axis corresponding to the opening direction of the door. The LEDs 66 are driven to turn on or blink in sequence in the frontward direction Fr when, for example, the reception of the closing operation for the sliding door 3 is completed. The frontward direction Fr corresponds to the second direction, which is the axis corresponding to the closing direction of the door.

Even if such a change is made, the same advantages as those of the above-described embodiment can be gained.

Figure 15:
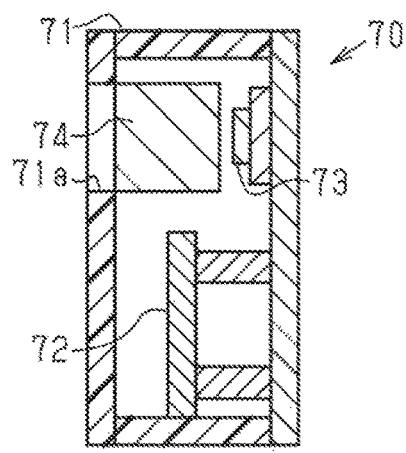
FIG. 15 is a cross-sectional view showing the structure of a vehicle operation detection device according to a modification.

Referring to FIG. 15, a sensor unit 70 including a case 71 may be employed. In the case 71, LEDs 73, which correspond to the light-emitting members, are arranged above an electrode 72 of a capacitance sensor, which corresponds to the sensor. Further, the case 71 may accommodate a light guide 74 and include a through-hole 71a. The light guide 74 is located closer to the window glass 5 than the LEDs 73. The through-hole 71a is opposed to the light guide 74.

Figure 16:
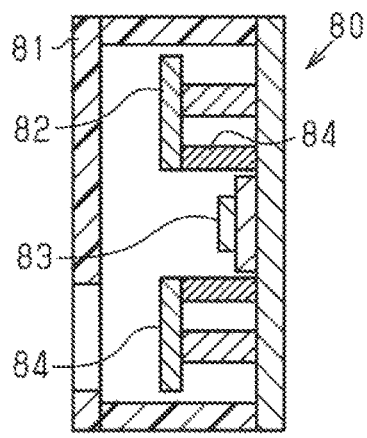
FIG. 16 is a cross-sectional view showing the structure of a vehicle operation detection device according to a modification.

Referring to FIG. 16, a sensor unit 80 including a case 81 may be employed. In the case 81, LEDs 83, which correspond to the light-emitting members, are arranged below an electrode 82 of a capacitance sensor, which corresponds to the sensor. Further, light guides 84 are arranged above and below the LEDs 83.

In the above-described embodiment, the position sensor 22 may be a position sensor that directly detects the opening-closing position of the sliding door 3. Alternatively, the position sensor 22 may be a rotation sensor that detects a rotation position of the door driving unit 11 (for example, the rotation shaft of an electric motor or the output shaft of a reduction drive), which opens and closes the sliding door 3. The rotation sensor may include, for example, a potentiometer, a rotary encoder, or a Hall sensor.

In the above-described embodiment, rear swiping may only represent only the operation for opening the sliding door 3. Likewise, front swiping may represent only the operation for closing the sliding door 3.

In the above-described embodiment, the LEDs 37, 73, and 83 may be arranged in the side skirt 9 or the side mudguard such that they are spaced apart from one another in the front-rear direction, which corresponds to the axis in the opening-closing direction of the door.

In the above-described embodiment, there may be any number of electrodes of the sensor units 30, 70, and 80 as long as the number of the electrodes is multiple.

In the above-described embodiment, the sensor units 30, 70, and 80 may be incorporated in a belt molding 8, which is shown in FIG. 1.

In the above-described embodiment, when ID authentication is established in the fully-closed state of the sliding door 3, the LEDs 37, 66, 73, and 83 may be driven to turn on or blink in sequence in the rearward direction Rr. Likewise, when ID authentication is established in the fully-open state of the sliding door 3, the LEDs 37, 66, 73, and 83 may be driven to turn on or blink in sequence in the frontward direction Fr.

In the above-described embodiment, when the LEDs 37, 66, 73, and 83 are driven to indicate rear swiping or front swiping, the brightness of the LEDs 37, 66, 73, and 83 may be varied.

In the above-described embodiment, in each operation mode, the LEDs 37, 58, 66, 73, and 83 may turn on or blink and turn off in reverse. That is, in each operation mode, the LEDs 37, 58, 66, 73, and 83 that have been on or have blinked may turn off and the LEDs 37, 58, 66, 73, and 83 that have been off may turn on or blink.

In the above-described embodiment, as long as the sensors are laid out in the vehicle at positions that do not disturb operation performed by the user, the arrangement of the sensors may be changed. For example, when the operation target is the back door 52, the sensors may be located on the surface of the garnish 54. When the operation target is the sliding door 3, the sensors may be located on the surface of a pillar or an outside door handle. In short, the sensors simply need to be laid out in the vehicles 1 and 50 along the axis in the opening-closing direction of the door.

In the above-described embodiment, as long as a detection signal that changes when a part of the body of the user moves toward the sensors can be output, the sensors may be infrared sensors, optical sensors (such as pyroelectric sensors), ultrasonic sensors, or heat sensors.

In the above-described embodiment, the door may be, for example, a swing door, a hood, or a trunk lid.

The control circuit 43 (for example, operation direction indicator 43a) is not limited to a device that includes a CPU and a ROM and executes software processing. For example, a dedicated hardware circuit (such as an ASIC) may be provided that executes at least part of the software processes executed in the above-described embodiment. That is, control circuit 43 (for example, operation direction indicator 43a) may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software execution devices each including a processor and a program storage device and a plurality of dedicated hardware circuits may be provided. That is, the above-described processes may be executed in any manner as long as the processes are executed by processing circuitry that includes at least one of a set of one or more software execution devices and a set of one or more dedicated hardware circuits. The program storage devices, or computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle operation detection device comprising:
sensors laid out in a vehicle along an axis in an opening-closing direction of a door of the vehicle and configured to individually output a detection signal that changes when a part of a body of a user moves toward the sensors, wherein
when the user moves the part of the body toward the sensors and a motion of moving the part of the body along the axis is detected, the sensors detect an opening-closing operation for the door, and
the vehicle operation detection device further comprises:
light-emitting members laid out in the vehicle along the axis in the opening-closing direction; and
an operation direction indicator configured to drive the light-emitting members in sequence in a first direction extending along the axis and corresponding to an opening direction in a fully-closed state of the door and configured to drive the light-emitting members in sequence in a second direction extending along the axis and corresponding to a closing direction in a fully-open state of the door, wherein
the number of the light-emitting members is three or more, one of the light-emitting members that is located on a middle in the axis being a middle light-emitting member, and
when the door is stopped in a semi-open state, the operation direction indicator is configured to drive the light-emitting members in sequence in the first direction toward the middle light-emitting member and drive the light-emitting members in sequence in the second direction toward the middle light-emitting member.

2. The vehicle operation detection device according to claim 1, wherein, when ID authentication executed by a communication member that wirelessly communicates with a portable device carried by the user is established, the operation direction indicator is configured to drive the light-emitting members in correspondence with a position of one of the sensors toward which the user should initially move the part of the body.

3. The vehicle operation detection device according to claim 1, wherein, when the opening-closing operation for the door is detected, the operation direction indicator is configured to drive the light-emitting members such that all the light-emitting members turn on or blink, or such that all the light-emitting members turn off.

4. The vehicle operation detection device according to claim 1, wherein one of the sensors is any one of an electrode of a capacitance sensor, an optical sensor, an ultrasonic sensor, and a heat sensor.

5. A vehicle operation detection device comprising:
a set of sensors laid out in a vehicle in a first direction corresponding to an opening direction of a door of the vehicle, wherein each of the sensors is configured to detect a part of a body of a user, and the vehicle operation detection device is configured to detect an opening operation for the door when the user moves the part of the body toward one of the sensors and moves the part of the body in the first direction, and detect a closing operation for the door when the user moves the part of the body toward another one of the sensors and moves the part of the body in a second direction that is opposite to the first direction;
a set of light-emitting members laid out in the vehicle in the first direction; and
processing circuitry configured to drive the light-emitting members in sequence in the first direction when the door is in a fully-closed state and configured to drive the light-emitting members in sequence in the second direction when the door is in a fully-open state, wherein
the set of light-emitting members includes a first light-emitting member, a second light-emitting member, and a third light-emitting member laid out in sequence in the first direction, and
when the door is stopped in a semi-open state, the processing circuitry is configured to drive the first light-emitting member and the second light-emitting member in sequence and configured to drive the third light-emitting member and the second light-emitting member in sequence.

6. The vehicle operation detection device according to claim 5, wherein, when reception of the opening operation or the closing operation for the door is completed, the processing circuitry is configured to drive the light-emitting members such that all the light-emitting members turn on, blink, or turn off.

7. The vehicle operation detection device according to claim 5, wherein
the door is a sliding door arranged at a side part of the vehicle and configured to move in a horizontal direction,
the sliding door is configured to move in a rearward direction to change from the fully-closed state to the fully-open state and configured to move in a frontward direction to change from the fully-open state to the fully-closed state, and
the first direction is the rearward direction and the second direction is the frontward direction.

8. The vehicle operation detection device according to claim 5, wherein
the door is a back door coupled to a rear part of the vehicle by a door hinge and configured to move in a vertical direction while pivoting around the door hinge,
the back door is configured to move in an upward direction to change from the fully-closed state to the fully-open state and configured to move in a downward direction to change from the fully-open state to the fully-closed state, and
the first direction is the upward direction and the second direction is the downward direction.

* * * * *